(12) United States Patent
Demange et al.

(10) Patent No.: US 12,101,759 B2
(45) Date of Patent: Sep. 24, 2024

(54) METHODS AND SYSTEMS FOR ESTABLISHING IN-FLIGHT NETWORK TRAFFIC POLICIES FOR PERSONAL ELECTRONIC DEVICES

(71) Applicant: Viasat Inc., Carlsbad, CA (US)

(72) Inventors: Christopher J. Demange, San Diego, CA (US); Shameem Hashmi, Carlsbad, CA (US); Navneeth Pusapati, San Diego, CA (US)

(73) Assignee: Viasat, Inc., Carlsbad, CA (US)

( * ) Notice: Subject to any disclaimer, the term of this patent is extended or adjusted under 35 U.S.C. 154(b) by 0 days.

(21) Appl. No.: 18/313,487

(22) Filed: May 8, 2023

(65) Prior Publication Data

US 2023/0276432 A1    Aug. 31, 2023

Related U.S. Application Data

(63) Continuation of application No. 17/546,704, filed on Dec. 9, 2021, now Pat. No. 11,690,061, which is a
(Continued)

(51) Int. Cl.
*H04W 72/1263*    (2023.01)
*H04L 47/20*    (2022.01)
(Continued)

(52) U.S. Cl.
CPC ......... *H04W 72/1263* (2013.01); *H04L 47/20* (2013.01); *H04L 47/808* (2013.01);
(Continued)

(58) Field of Classification Search
None
See application file for complete search history.

(56) References Cited

U.S. PATENT DOCUMENTS

| | | | |
|---|---|---|---|
| 8,055,704 B2 | 11/2011 | Benco et al. | |
| 9,087,193 B2 | 7/2015 | Wahler et al. | |

(Continued)

FOREIGN PATENT DOCUMENTS

| | | |
|---|---|---|
| EP | 2260585 B1 | 12/2014 |
| IN | 647/DEL/2011 A | 12/2012 |
| KR | 200000074771 A | 12/2000 |

OTHER PUBLICATIONS

Airport WiFi Guide, "Airlines In-flight WiFi Access Fees Table", http://www.airportwifiguide.com/airlines-in-flight-wifi-access-fees-table/, Aug. 4, 2015, 4 pgs.
(Continued)

*Primary Examiner* — Yaotang Wang
(74) *Attorney, Agent, or Firm* — Holland & Hart LLP

(57) ABSTRACT

Methods and systems establish a traffic policy for a personal electronic device based on one or more physical characteristics of the device. In some aspects, a database of traffic policies is maintained. The traffic policies are for accessing a network via a wireless communications link. A network access unit receives a request from a personal electronic device to access the network. The request is analyzed to determine a physical characteristic of the device. A traffic policy is established from the database for the device based, at least in part, on the determined physical characteristic of the device. Transmission of network traffic for the device is then scheduled based at least in part, on the established traffic policy.

26 Claims, 9 Drawing Sheets

Related U.S. Application Data continuation of application No. 16/798,949, filed on Feb. 24, 2020, now Pat. No. 11,234,255, which is a continuation of application No. 16/031,189, filed on Jul. 10, 2018, now Pat. No. 10,609,723, which is a continuation of application No. 15/052,828, filed on Feb. 24, 2016, now Pat. No. 10,051,652.

(51) Int. Cl.
| | | |
|---|---|---|
| *H04L 47/80* | (2022.01) | |
| *H04M 1/72403* | (2021.01) | |
| *H04W 72/12* | (2023.01) | |
| *H04M 1/72454* | (2021.01) | |
| *H04W 8/22* | (2009.01) | |

(52) U.S. Cl.
CPC ....... *H04M 1/72403* (2021.01); *H04W 72/12* (2013.01); *H04M 1/72454* (2021.01); *H04W 8/22* (2013.01)

(56) References Cited

U.S. PATENT DOCUMENTS

| | | | |
|---|---|---|---|
| 10,051,652 B2 | 8/2018 | Demange et al. | |
| 2013/0145258 A1 | 6/2013 | Reilly et al. | |
| 2014/0053243 A1 | 2/2014 | Walsh et al. | |
| 2014/0136658 A1 | 5/2014 | Wahler | |
| 2014/0270400 A1 | 9/2014 | Natale | |
| 2014/0282747 A1 | 9/2014 | Richman et al. | |
| 2014/0289759 A1* | 9/2014 | Nakano | H04N 21/2541 725/31 |
| 2015/0133116 A1 | 5/2015 | Lauer et al. | |
| 2015/0133117 A1 | 5/2015 | Lauer et al. | |
| 2016/0036825 A1 | 2/2016 | Manroa | |
| 2016/0050214 A1 | 2/2016 | Chambers et al. | |
| 2016/0119052 A1 | 4/2016 | Frerking et al. | |
| 2017/0245298 A1 | 8/2017 | Demange et al. | |
| 2017/0295094 A1* | 10/2017 | Jackson | H04L 67/01 |
| 2018/0225451 A1* | 8/2018 | Wahler | H04L 67/12 |
| 2019/0052349 A1* | 2/2019 | Russell | H04B 7/18506 |
| 2019/0053106 A1* | 2/2019 | Russell | H04W 36/083 |

OTHER PUBLICATIONS

Delta, "In-Flight Wi-Fi", http://www.delta.com/content/www/en_US/traveling-with-us/onboard-experience/entertainment/in-flight-wi-fi.htm., Aug. 4, 2015, 2 pgs.

Chamberlin, "Review: Japan Airlines Boeing 777 Sky Wi-Fi Inflight Internet", Australian Business Traveler, http://www.ausbt.com.au/japan-airlines-boeing-777-300er-sky-wi-fi-inflight-internet-review, Jan. 13, 2015, 6 pgs.

Chamberlin, "Review: Scoot Boeing 787 Dreamliner Inflight Internet", Australian Business Traveler, http://www.ausbt.com.au/scoot-boeing-787-dreamliner-inflight-internet-wi-fi-review?utm_source=internal&utm_medium=relatedstories&utm_campaign=related-articleend, Feb. 13, 2015, 5 pgs.

Lufthansa, "Lufthansa Fly Net®: Limitless Communication on Long-Haul Flights", http://www.lufthansa.com/in/en/Fly-Net, Aug. 4, 2015, 2 pgs.

Singapore Air, "Internet Access, Text and Multimedia Messaging", https://www.singaporeair.com/jsp/cms/en_UK/flying_with_us/inflight-connectivity.jsp, Aug. 4, 2015, 2 pgs.

* cited by examiner

METHODS AND SYSTEMS FOR ESTABLISHING IN-FLIGHT NETWORK TRAFFIC POLICIES FOR PERSONAL ELECTRONIC DEVICES

CROSS-REFERENCE TO RELATED CASES

The present Application for Patent is a continuation of U.S. patent application Ser. No. 17/546,704 by Demange et al., entitled "METHODS AND SYSTEMS FOR ESTABLISHING IN-FLIGHT NETWORK TRAFFIC POLICIES FOR PERSONAL ELECTRONIC DEVICES" filed Dec. 9, 2021, which is a continuation of U.S. patent application Ser. No. 16/798,949 by Demange et al., entitled, "METHODS AND SYSTEMS FOR ESTABLISHING IN-FLIGHT NETWORK TRAFFIC POLICIES FOR PERSONAL ELECTRONIC DEVICES" filed Feb. 24, 2020, which is a continuation of U.S. application Ser. No. 16/031,189 by Demange et al., entitled "METHODS AND SYSTEMS FOR ESTABLISHING IN-FLIGHT NETWORK TRAFFIC POLICIES FOR PERSONAL ELECTRONIC DEVICES" filed Jul. 10, 2018, which is a continuation of U.S. application Ser. No. 15/052,828 by Demange et al., entitled "METHODS AND SYSTEMS FOR ESTABLISHING IN-FLIGHT NETWORK TRAFFIC POLICIES FOR PERSONAL ELECTRONIC DEVICES" filed Feb. 24, 2016, the entirety of each of which are incorporated herein by reference for any and all purposes.

BACKGROUND

Embodiments relate generally to communications systems.

In-flight entertainment technology is evolving. Some of the first forms of in-flight entertainment included movies shown to an entire cabin of passengers via shared video screens. Later, individual screens were provided in seatbacks, allowing each individual passenger to choose between a finite selection of available movies and/or other programming. Both of these prior solutions relied on media content stored on the aircraft itself, typically either in VHS tape or DVD formats.

More recently, satellite connectivity has been introduced into the aircraft cabin. Connection of in-flight entertainment systems to terrestrial networks via satellite has greatly expanded the role of in-flight entertainment systems. Not only has satellite connectivity enabled the delivery of live television to the aircraft cabin, but these systems have evolved to not only entertain, but also provide connectivity to information related services such as email and web browsing. Moreover, passengers may prefer to seek out their own entertainment, available via the Internet via streaming servers, instead of selecting content stored on the aircraft itself.

BRIEF SUMMARY

Disclosed are methods and system to schedule network traffic generated by devices within an airplane (for example, within a passenger cabin or cockpit of the airplane). Passengers and/or crew members may use a variety of devices to connect to the Internet. For example, business people may prefer to connect via a laptop device, as the laptop may provide the power and applications necessary to perform important business functions, such as communication via email, reviewing electronic documents, updating spreadsheets, and the like. The casual traveler may prefer to connect via a tablet computer or cell phone, providing convenient access to their favorite web site or video service. Some passengers may even prefer to use a game device to connect to the internet, perhaps for a networked game experience with their terrestrial bound peers. Crew members may prefer small devices easily carried, such as smart phones.

Each of users of these devices may also impose different loads on the access network. For example, laptop computers may impart a relatively modest load on a network, as typical laptop applications such as email, word processing, and spreadsheets do not typically generate high network usage. In contrast, a smart phone or tablet may indicate a higher propensity to utilizing streaming services, which may rely on greater need by a user for network bandwidth, to provide movies, music, or other data intensive content. A game console may perform substantial local processing, and thus a user accessing the network via the game console may impose a load on the network that is also relatively low. By understanding characteristics of devices used to access an Internet service, the disclosed methods and systems may provide a user with a networking experience more tailored to their specific needs. With the disclosed methods and systems, this tailored experience can be delivered automatically, improving case of use. Furthermore, automatic selection of traffic policies appropriate for a user device may also avoid inadvertent selection of a traffic policy by a user that is not aligned with what the user's device can do and how the user will utilize their network access.

Therefore, the disclosed methods and systems may associate network traffic policies appropriate for each of the above users based, at least in part, on one or more characteristics of a device they use to connect to the network. Network traffic for each of these users may then be scheduled based on their associated traffic policies.

The screen size of a device may be one indicator of how the user may use the device to access the network. For example, larger screen sizes may support higher resolution video, which generally requires a larger amount of network data to be transferred to the device. In contrast, a smaller screen size, such as screens on some cell phones, may provide a high quality video playback experience using a relatively lower resolution video, thus, a smaller screen size may indicate that a user will be viewing lower resolution video on the device, and thus consuming fewer network resources when utilizing this device.

In some aspects, an indicator of screen size associated with a personal electronic device in communication via the access network may be directly or indirectly determined. In some aspects, the screen size may be determined based on a make and/or model of the device. In some aspects, the make and/or model of the device may be determined based on one or more network messages transmitted by the device to a network controller. For example, in some aspects, indicators of a make and/or model number of the device may be included in one or more hypertext transfer protocol (http) messages, for example, as mime types. Traffic policies available to the user may then be determined, at least in part, based on the indicator of the screen size. In some other aspects, one or more of a transmission control protocol (TCP) signature, media access control address, dynamic host control protocol (DHCP) signature, or other aspects of a device's network communication may be used to determine one or more characteristics of the device.

Once one more characteristics of device personal electronic device are determined, one or more policies may be identified as potentially applicable for the device based, at least in part, on the one or more determined characteristics. In some cases, these policies may differ in one or more of network services (e.g. email, web browsing, file transfer, virtual private networking, streaming media), and network capacity (for example, upload and/or download speed, latency, and/or throughput) provided by the policies. The policies may also differ in the amount of time provided for network access under the policy, and/or the cost incurred by the passenger to utilize each policy.

Furthermore, a route taken by the particular vehicle providing the transportation may affect network capabilities available during the transportation activity. For example, some access networks with particular capabilities may be available via a first route, but only access networks with fewer capabilities are available via a second route. For example, an access network available to a flight over the continental United States may provide a higher data throughput than an access network available during a flight from San Diego to Hawaii. Therefore, in some aspects, the methods and systems disclosed may interface with a flight management computer of the airplane when selecting one or more traffic policies that may be applied to a device of particular characteristics. In some aspects, a route of flight is determined from the flight management computer or some other means, from which one or more characteristics of available access network(s) may be determined. A traffic policy for one or more passengers may then be determined, at least in part, on the characteristics of the available access networks. For example, in some aspects, available capacities of each network, in terms of, for example, bandwidth, latency, throughput, packet loss rates, or other measurements of network capacity or capability, may be utilized to determine a traffic policy for a particular device or classes of devices.

If multiple policies are available, in some aspects, the user may be prompted to select one policy from the multiple available policies. In some aspects, this selection may be accomplished via a web-based interface between the personal electronic device and a web server managed and/or controlled by a access network controller.

One aspect disclosed is a method of providing network access to a personal electronic device within an airplane via a wireless communications link. The method includes maintaining a database of traffic policies for accessing a network via the wireless communications link, receiving, at a network access unit, a request from the personal electronic device to access the network, analyzing the request to determine a physical characteristic of the device, establishing a first traffic policy from the database for the personal electronic device based, at least in part, on the determined physical characteristic of the device; and scheduling transmission of network traffic for the device over the wireless communications link according to the first traffic policy. In some aspects, the method also includes determining a plurality of traffic policies, including the first traffic policy, from the database based on the determined physical characteristic of the device, providing, to the device, data indicating the plurality of traffic policies for display; and receiving input indicating a selection of the first preexisting traffic policy from among the plurality of traffic policies, wherein the establishing of the first traffic policy is in response to the selection. In some aspects, the method also includes determining a screen size of the device based on the one or more network packets from the device, and determining the first preexisting traffic policy from the database based, at least in part, on the screen size.

In some aspects, the method includes determining a manufacturer and model of the device, and determining the screen size of the device based at least in part on the manufacturer and model. In some aspects, determining the physical characteristic of the device comprises determining a device type for the device. In some aspects, determining a device type for the device comprises determining whether the device is one of a cell phone, tablet, laptop, or game device. In some aspects, the method includes providing access only to network services associated with the first traffic policy. In some aspects, the network services associated with the first traffic policy include one or more of virtual private network access, video streaming, text messaging, email messaging, and web browsing. In some aspects, the method also includes receiving subscriber identification information from the first device, receiving, via a network access unit, a request from the subscriber to access the network by a second device within the airplane, analyzing the request to determine a physical characteristic of the second device, determining a second physical device characteristic of the second device based on a plurality of network packets transmitted by the second device, receiving the subscriber identification information from the second device, determining a second plurality of traffic policies based on the second physical device characteristic of the second device and in response to the subscriber identification information being received from the second device, providing, to the second device, second data indicating a second plurality of traffic policies to the second device for display, receiving input defining a second selection of a second traffic policy from the second plurality of traffic plans; and scheduling network traffic from the second device based on the selected second traffic policy. In some aspects, the method also includes determining the second selected traffic policy provides different, more, or less network access than the first selected traffic policy in at least one respect; and providing, to the second device, third data indicating the difference for display on an electronic display of the second device. In some aspects, the method includes generating third data to define a message to the subscriber. In some aspects, the method includes determining a route of flight for the airplane; and identifying one or more access networks available along the route, wherein the determination of the plurality of traffic policies is based on the identified one or more available access networks.

Another aspect disclosed is an apparatus for providing network access to a personal electronic device within an airplane via a wireless communications link. The apparatus includes a stable data storage that maintains a database of traffic policies for accessing a network via the wireless communications link, an electronic hardware processor configured to: receive a request from the personal electronic device to access the network, analyze the request to determine a physical characteristic of the device, establish a first traffic policy from the database for the personal electronic device based, at least in part, on the determined physical characteristic of the device, and schedule transmission of network traffic for the device over the wireless communications link according to the first traffic policy.

In some aspects, the processor is further configured to: determine a plurality of traffic policies, including the first traffic policy, from the database based on the determined physical characteristic of the device, provide, to the device, data indicating the plurality of traffic policies for display; and receive input indicating a selection of the first preexisting traffic policy from among the plurality of traffic policies, wherein the establishing of the first traffic policy is in response to the selection. In some aspects of the apparatus, the processor is further configured to: determine an indication of a screen size of the device based on the one or more network packets from the device, and determine the first preexisting traffic policy from the database based, at least in part, on the indication of the screen size.

In some aspects, the processor is further configured to determine a manufacturer and model of the device, and determining the indication of screen size of the device based at least in part on the manufacturer and model. In some aspects, determining the physical characteristic of the device comprises determining a device type for the device.

In some aspects, determining a device type for the device comprises determining whether the device is one of a cell phone, tablet, laptop, or game device. In some aspects, the processor is further configured to: provide access only to network services associated with the first traffic policy, wherein the network services associated with the first traffic policy include one or more of virtual private network access, video streaming, text messaging, email messaging, and web browsing.

Another aspect disclosed is a computer readable storage medium comprising instructions that when executed cause a processor to provide a method of providing network access to a personal electronic device within an airplane via a wireless communications link, the method including maintaining a database of traffic policies for accessing a network via the wireless communications link, receiving, at a network access unit, a request from the personal electronic device to access the network, analyzing the request to determine a physical characteristic of the device, establishing a first traffic policy from the database for the personal electronic device based, at least in part, on the determined physical characteristic of the device; and scheduling transmission of network traffic for the device over the wireless communications link according to the first traffic policy.

BRIEF DESCRIPTION OF THE DRAWINGS

The present disclosure is described in conjunction with the figures.

In the figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present disclosure. However, one having ordinary skill in the art should recognize that the disclosure can be practiced without these specific details. In some instances, circuits, structures, and techniques have not been shown in detail to avoid obscuring the present disclosure.

Figure 1:
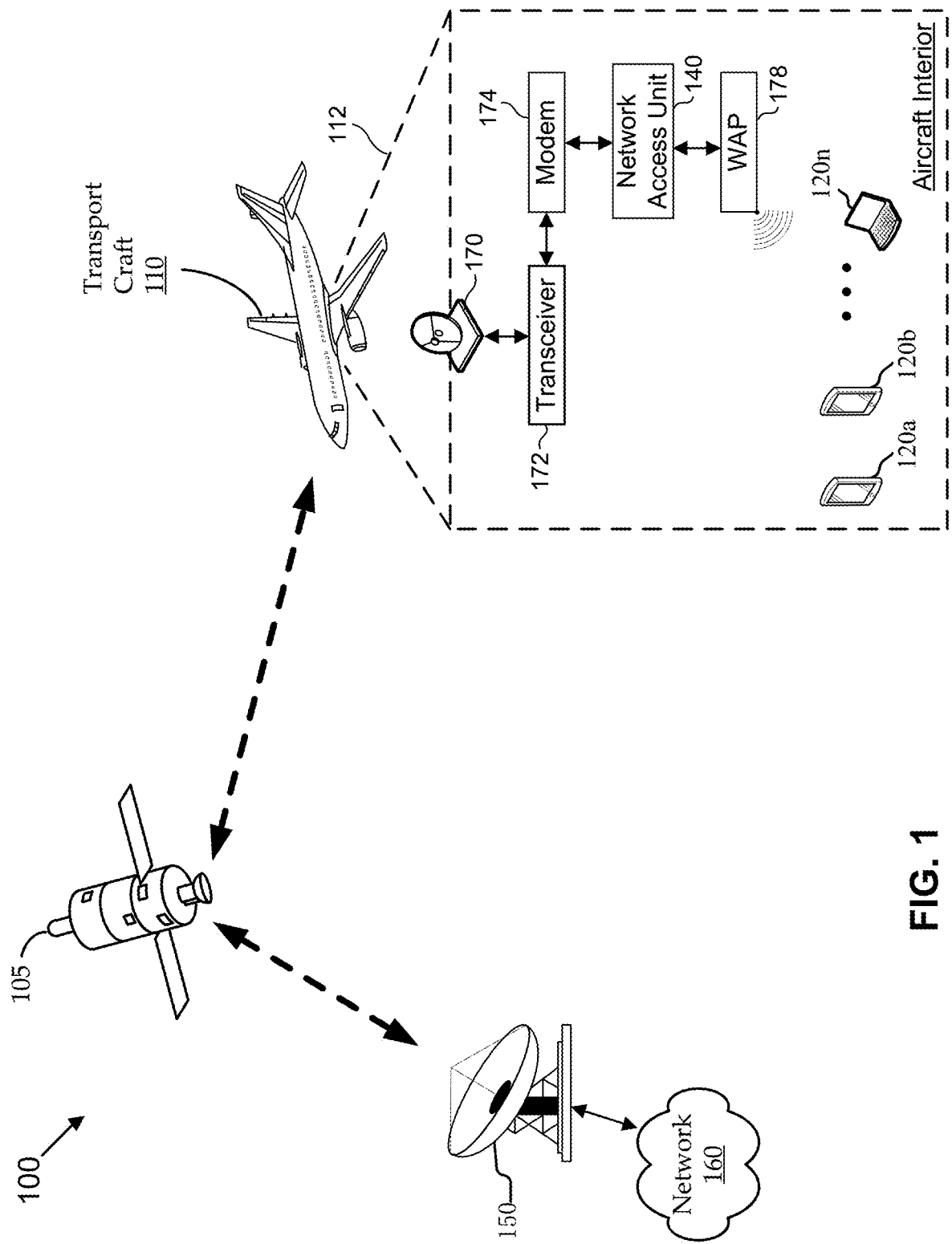
FIG. 1 shows a simplified diagram of a communications system, which provides a context for various embodiments.

FIG. 1 shows a simplified diagram of a communications system 100, which provides a context for various embodiments. Many other configurations are possible having more or fewer components than the communications system 100 of FIG. 1. In the illustrated embodiment, the communications system 100 includes a transport craft 110 in communication with a terrestrial network 160 via a satellite 105, and a gateway 150. The transport craft 110 can include a two-way communication system 112 to facilitate bidirectional communication with the satellite 105. In the illustrated embodiment, the two-way communication system 112 includes an antenna system 170, transceiver 172, modem 174, network access unit 140, wireless access point (WAP) 178, and one or more personal electronic devices 120a-n.

The two-way communication system 112 can provide for reception of a forward downlink signal from the satellite 105 and transmission of a return uplink signal to the satellite 105 to support two-way data communications between personal electronic devices 120 within the transport craft 110 and the terrestrial network 160. The personal electronics devices 120 can include smartphones, laptops, tablets, netbooks, and the like brought onto the transport craft 110 by passengers or crew. As further examples, the personal electronic devices 120 can include passenger seat back systems or other devices on the transport craft 110, including passenger and/or crew devices. The personal electronic devices 120 can communicate with the network access unit 140 via a communication link that can be wired and/or wireless. The communication link can be, for example, part of a local area network such as a wireless local area network (WLAN) supported by WAP 178. One or more WAPs 178 can be distributed about the transport craft 110, and can, in conjunction with network access unit 140, provide traffic switching and routing functionality; for example, as part of a WLAN extended service set (ESS), etc.

In operation, the network access unit 140 can provide uplink data received from the personal electronic devices 120 to the modem 174 to generate modulated uplink data (e.g., a transmit intermediate frequency (IF) signal) for delivery to the transceiver 172. The transceiver 172 can upconvert and then amplify the modulated uplink data to generate the return uplink signal for transmission to the satellite 105 via the antenna system 170. Similarly, the transceiver 172 can receive the forward downlink signal from the satellite 105 via the antenna system 170. The transceiver 172 can amplify and downconvert the forward downlink signal to generate modulated downlink data (e.g., a receive IF signal) for demodulation by the modem 174. The demodulated downlink data from the modem 174 can be provided to the network access unit 140 for routing to the personal electronic devices 120. The modem 174 can be integrated with the network access unit 140, or can be a separate component in some examples.

As described in more detail below, in some implementations, the network access unit 140 may provision and/or schedule network traffic generated by personal electronic devices 120*a-n*. For example, when a user first attempts to gain access to the network 160, their personal electronic device may interface with the network access unit 140 via the wireless access point 178. The network access unit 140 may detect one or more characteristics of the personal electronic device, such as whether the device is a laptop, cell phone or tablet, and/or the network access unit 140 may determine an indicator of the screen size of the device. The network access unit 140 may then present for display on the device, one or more options for establishing a traffic policy that controls access to the network 160 via satellite 105. The options may determine which network services are available to the device over the access network. For example, the options may determine whether the user has access to one or more of web browsing, email, instant messages, and streaming media. Each of the options may also be available for a different cost to the user. Once the user selects which option they prefer, the user's account may be charged an appropriate fee and a traffic policy established for the user's device based on the traffic policy selected. The network access unit 140 may then schedule traffic for the user based on the selected traffic policy.

In the illustrated embodiment, the transport craft 110 is an airplane. Alternatively, the transport craft 110 may be other than an airplane, such as a train, bus, cruise ship, other type of aircraft, etc. As illustrated, the network 160 can be any type of network and can include for example, the Internet, an IP network, an intranet, a wide area network (WAN), local area network (LAN), a virtual private network (VPN), a virtual LAN (VLAN), a fiber optic network, a cable network, a public switched telephone network (PSTN), a public switched data network (PSDN), a public land mobile network, and/or any other type of network supporting communication as described herein. The network 160 can include both wired and wireless connections as well as optical links.

While a single airplane is shown in communication via a single satellite, techniques described herein can be applied in many other communications environments without departing from the scope of the inventions. For example, one or more transport craft(s) 110 can include airplanes, trains, buses, cruise ships, etc.; and any or all such transport craft(s) 110 can communicate via any one or more suitable communications architecture(s) including any suitable communications links or access networks, such as satellite communications systems, air-to-ground communication systems, hybrid satellite and air-to-ground communications systems, cellular communications systems, etc. Typically, because of the mobile nature of the transport craft 110, the communications architecture will likely involve at least one wireless communications link.

Increasingly, in context of transport craft 110, carriers desire to provide their passengers with more access to content, which can include providing access from sources remote to the transport craft 110 (e.g., from the Internet and/or other remote sources, as opposed to from on-craft storage). Carriers may also desire to provide Internet access to their crew members, to facilitate, for example, case of communication with ground personnel and/or other crew members. This can involve maintaining one or more communications links between the transport craft 110 and a terrestrial network (e.g., via the satellite 105). There is typically a further desire to provide an increasing variety of media options to passengers and often at a quality (e.g., resolution, color depth, etc.) that has increased over time. For example, personal electronic devices with high-fidelity displays are increasingly ubiquitous among passengers. While it may be ideal for the transport craft 110 to receive all the desired media options at a highest desired fidelity at all times during transport, this may be cost prohibitive.

Figure 2:
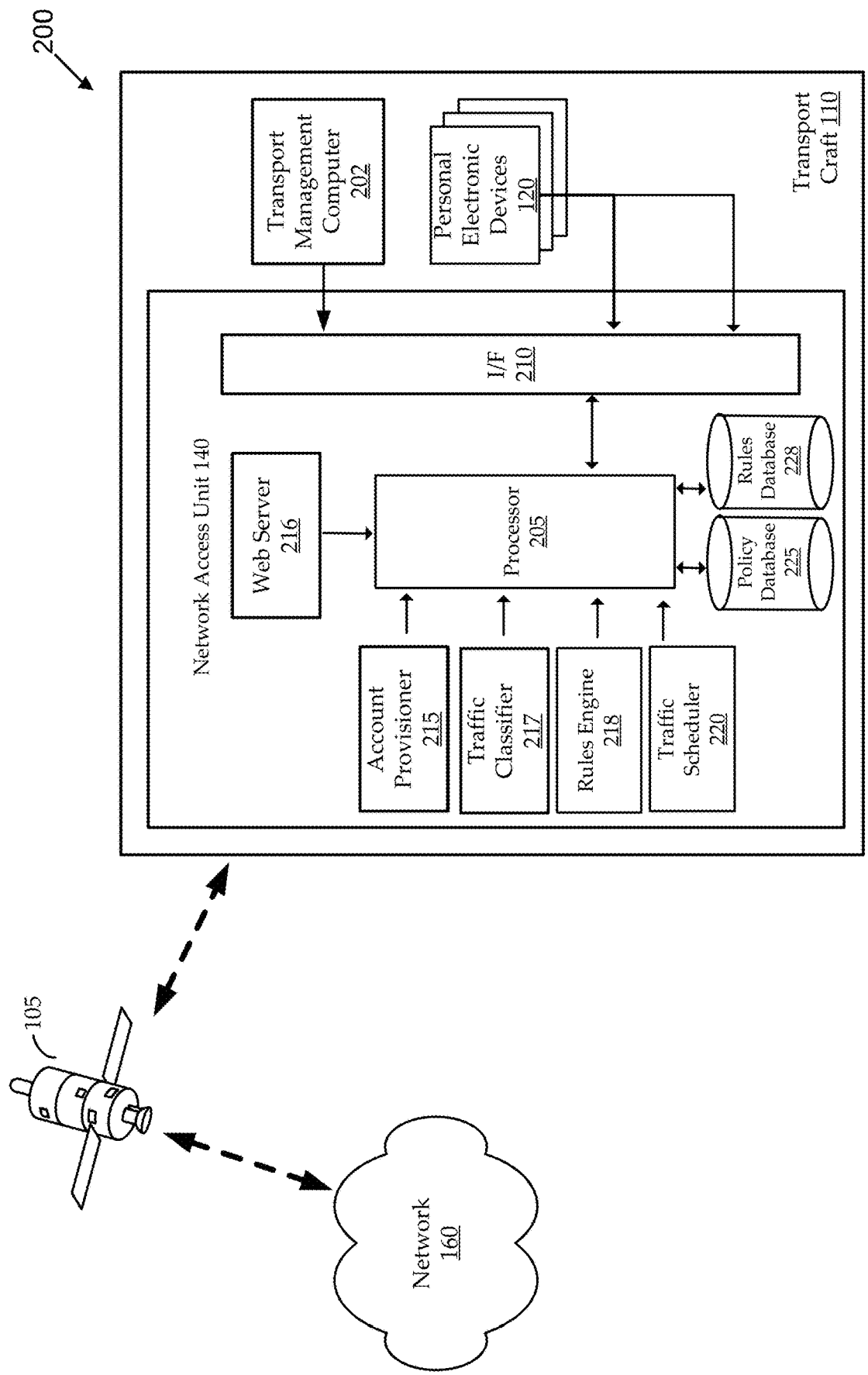
FIG. 2 shows a block diagram of an illustrative in-transport media delivery system, according to various embodiments.

FIG. 2 shows another view of the communications system 100 including a detailed block diagram of one example embodiment of the network access unit 140. Many other configurations of the network access unit 140 are possible having more or fewer components. While shown as a single physical computing device in FIG. 2, in some aspects, one or more of the functions discussed below with respect to the network access unit 140 may be performed by different physical computing devices. In some aspects, the network access unit 140 may include fewer functional components than shown in the examiner embodiment of FIG. 2. Moreover, the functionalities described herein can be distributed among the components in a different manner than described herein. In some aspects, the network access unit provides gateway functionality between the personal electronic devices 120 on the transport aircraft and the access networks discussed above with respect to FIG. 1. For example, in some aspects, all network traffic transmitted by and/or received by the personal electronic devices 120 may be processed by the network access unit 140. For example, in some aspects, network traffic transmitted to the personal electronic devices 120 from devices within the network 160 may be electronically received by the network access unit 140, which then forwards or retransmits the network traffic to the personal electronic devices 120 according to one or more policies. Similarly, in some aspects, network traffic transmitted to devices on the network 160 by the personal electronic devices 120 may be electronically received by the network access unit 140, which then may forward or retransmit the network traffic to destinations indicated in the network traffic (for example, to destinations within network 160) based on one or more policies.

Consistent with FIG. 1, an in-transport network access unit 140 is in communication, via satellite 105 (or other suitable communications network, as described above) and other components of the two-way communication system 112 (not shown in FIG. 2), with a terrestrial based network 160. The network access unit 140 may also be in communication with personal electronic devices 120 and, in some aspects, a transport management computer 202. In FIG. 2 and the following discussion, gateway 150 and some components (e.g., antenna system 170, transceiver 172, modem 174, WAP 178) of the two-way communication system 112 discussed above with respect to FIG. 1 are omitted to avoid over complication of the drawing.

The illustrated aspect of network access unit 140 includes an electronic hardware processor 205, and a network interface 210. The processor 205 may be in communication with the network interface 210 via an electronic bus within the network access unit 140 (not shown). The processor may communicate with the network interface 210 to transmit and/or receive packets over a network, such as a network providing connectivity to the wireless access point 178 and/or modem 174 discussed above with respect to FIG. 1. The processor may also communicate over the network interface 210 to exchange network messages with an personal electronic device 120 and/or a transport management computer 202.

The network access unit 140 also includes an account provisioner 215, a web server 216, a traffic classifier 217, a rules engine 220, and a traffic scheduler 220. The account provisioner 215, web server 216, traffic classifier 217, rules engine 220, and traffic scheduler 220 may be portions of a volatile or stable storage, such as a virtual or physical memory space accessible to processor 205. The account provisioner 215, web server 216, traffic classifier 217, rules engine 218, and traffic scheduler 220 may include binary data defining instructions that configure the processor 205 to perform various functions. For example, the account provisioner 215 may include instructions that configure the processor 205 to provision access to network 160 by one or more of the personal electronic devices 120a-n. The web server 216 may store instructions that configure the processor 205 to provide functionality associated with delivering electronic content via web standards, such as html/http. The traffic classifier 217 may include instructions that configure the processor 205 to classify network traffic received by the network access unit 140. For example, the traffic classifier 217 may determine whether traffic is email, web browsing traffic, video streaming traffic, messaging traffic, or other types of traffic. This information may be used to determine whether the traffic is allowed by a traffic policy as discussed in more detail below. The rules engine 218 may include instructions that configure the processor 205 to execute one or more rules that assign a traffic policy to a personal electronic device 120 based on one or more characteristics of the network device. The traffic scheduler 220 may include instructions that configure the processor 205 to schedule network traffic generated by the personal electronic devices 120a-n. Instructions in one or more of the account provisioner 215 and/or traffic schedule 220 may configure the processor 205 to read data from the policy database 225. For example, in some aspects, the processor 205 may read data from the policy database 225 in order to determine a traffic policy to apply to network traffic generated by one or more of the personal electronic devices 120a-n. The policy database 225 and rules database 228 are discussed in detail in FIG. 3 below. While FIG. 2 shows the network access unit 140 as one physical device, one of skill in the art would understand that in some aspects, the functions discussed above and below relating to the network access unit 140 may in some implementations be implemented on multiple physical devices. For example, in some aspects, functionality associated with each of the account provisioner 215, web server 216, traffic classifier 217, rules engine 218, and traffic scheduler 220 may each be provided on a separate physical device having its own dedicated electronic hardware processor, memory, and network interface. Additionally, in some implementations, the policy database 225 and rules database 228 may also be implemented on separate devices from one or more of the account provisioner 215, web server 216, traffic classifier 217, rules engine 218, and traffic scheduler 220. How the functionality discussed above and below is partitioned across one or multiple physical hardware devices does not substantially affect the methods and systems disclosed herein. While FIG. 2 shows the policy database 225 and rules database 228 included as part of the network access unit 140, in some other implementations, these components may be accessible via the network 160. In some of these aspects, the network access unit may be configured to cache at least a portion of the policy data 225 and/or rules database 228 in a local memory to provide for reliable and performant access to data contained therein.

Figure 3:
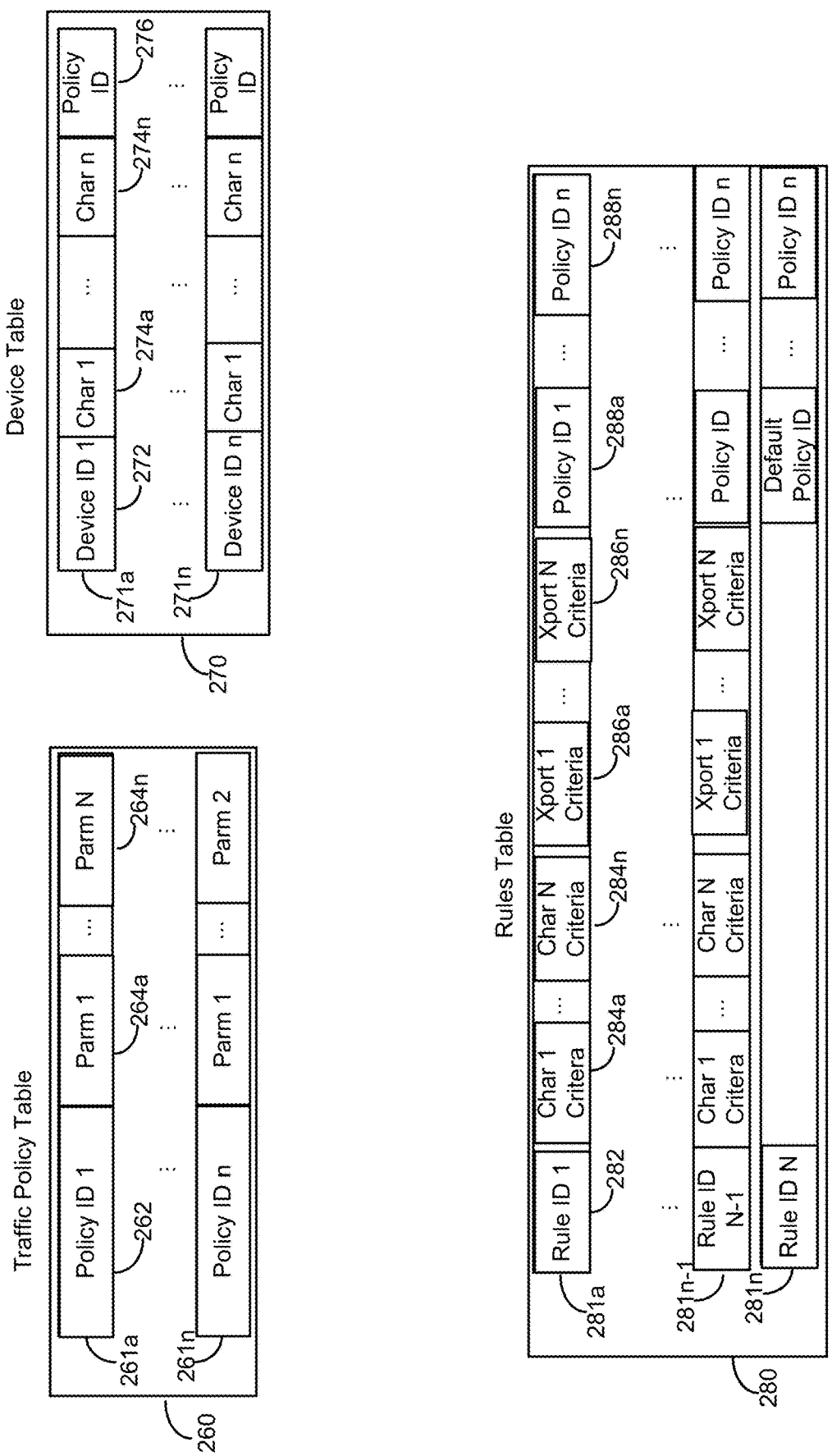
FIG. 3 shows data structures associated with an exemplary implementation of the disclosed methods and systems.

FIG. 3 shows exemplary relational database table structures for a traffic policy table 260, device table 270, and rules table 280. In some aspects, the traffic policy table 260 is included as part of the policy database 225 discussed above with respect to FIG. 2. In some aspects, the rules table 280 may be included as part of the rules database 228 discussed above with respect to FIG. 2.

The traffic policy table 260 stores data defining one or more traffic policies 261a-n. Each traffic policy includes a policy identifier 262, and one or more network control parameters 264a-n. Each of network control parameters 264a-n may define how network traffic managed by the respective policy is controlled. For example, a first network control parameter 264 may indicate one or more network services available under the respective policy. For example, the first network control parameter may indicate whether one or more of web browsing, instant messaging, email, audio streaming, video streaming, and virtual private network access is provided under the policy. In some aspects, a second network control parameter defined by a policy 261 may define one or more network scheduling parameters for network traffic controlled under the policy. For example, in some aspects, the second network control parameter may define a committed information rate (CIR) and/or a peak information rate (PIR) for network data controlled under the policy.

The device table 270 may define which traffic policy in traffic policy table 260 is applied to network traffic generated by a particular personal electronic device 120. The device table 270 may include a record 271a-n for each personal electronic device 120 managed by the network access unit 140. Each device entry 271 may include a device identifier 272 uniquely identifying a particular personal electronic device 120. For example, in some aspects, the device identifier 272 may be one or more of a station address of the device, a hash of one or more properties of the device, and a globally unique identifier of the device. Each device entry 271 also includes one or more determined characteristics 274a-n of the device. Each device entry 271 may also include an indicator of which traffic policy in the traffic policy table 260 should be used to manage network traffic generated by the personal electronic device 120. For example, if the personal electronic device 120 corresponding to device entry 271a has a policy identifier field 276 equivalent to the policy identifier field 262 of policy 261a, then network traffic generated by the personal electronic device 120 is managed by policy 261a.

In this exemplary embodiment, the rules table 280 stores one or more rules 281a-n used to establish a traffic policy for a particular personal electronic device 120. In some aspects, the rules 281a-n may be evaluated in a particular order. For example, in some aspects the rules may be evaluated from the "top" of the rules table 280 (lower order rows) toward the bottom (higher order rows) of the rule table 280. In some aspects, the rules may be executed in a sequence defined by the rule ids 282. The rules 281a-n also include one or criteria. In some aspects, if all of the criteria specified in a particular rule are satisfied, then the rule becomes active and any actions specified by the rule are taken. Otherwise, in some aspects, rules below the current rule are evaluated.

Each rule 281 includes a rule identifier 282, and one or more criteria 284a-n relating to one or more corresponding characteristics of an personal electronic device 120, and/or characteristics of available access networks. For example, the criteria 284a-n may be applied to corresponding characteristics 274a-n of an personal device, stored in the device table 270. In some implementations if the criteria 284a-n specified in a rule 281 match characteristics 274a-n of a personal electronic device 120, the particular policy corresponding to policy identifier 288 in the rule 281 may be stored in the policy identifier field 276 of the device table 270. This may establish the particular policy as applicable to the particular device identified in the device identifier field 272 of the device table 270.

A rule 281 may also include one or more criteria 286a-n relating to the transportation activity. For example, one transport activity criteria may evaluate a route taken during the transport activity (such as a route of an airline flight), or may evaluate a length of time remaining in the transportation activity. In these example, a criteria may specify that if the length of time remaining in the transportation activity is more than a threshold period of time (or less than a threshold period of time), the criteria is satisfied. Similarly, a criteria 286 may specify that if a route of flight is within particular geographic coordinates, then the criteria are satisfied (or not satisfied).

In particular, some routes of flight may include coverage by an access network (such as a satellite network) having a first set of characteristics, such as capacity, bandwidth, latency, and the like. A second route of flight may have coverage by a second access network having a second set of characteristics. Variations in these characteristics may effect which policy should be established for a particular personal electronic device 120. As another example, a time remaining in a transport activity, such as an airplane flight, may effect which policy should be established for a particular personal electronic device 120. Xport criteria 286a-n may be utilized to implement these types of features in some embodiments.

As a more specific example of how rules may establish a policy for a device, in one implementation a hypothetical rule 281a may be defined by rule table 280 to identify policy 261a in its policy identifier field 288. The rule 281a may also include a first criteria 284a evaluating whether a device is a laptop computer. If the device is a laptop computer, then the criteria 284a is satisfied. In this particular implementation, the rule 281 may include only this one criteria 284a. In this implementation, policy 261 would be established for all personal electronic devices 120a-n that are determined to be laptop computers. In this hypothetical example, the rules table 280 may include a second rule 281b. Rule 281b may identify policy 261b (not shown in FIG. 3) in its policy identifier field 288. Rule 281b may include no criteria. In this hypothetical example, if the rules 281 are evaluated "top down" as described above, rule 281b may function as a default rule, and establish policy 261b for all personal electronic devices that are not determined to be laptop computers via device table 270.

In some implementations, a plurality of policy identifiers 288a-n may be associated with a particular rule 281. In these implementations, when criteria 284 and/or 286 of a particular rule 281 are a match with a particular personal electronic 120, one of the plurality of policy identifiers 288a-n may be selected to establish a policy for the personal electronic device 120. In some aspects, this selection may be performed automatically, based on one or more criteria. In some other aspects, this selection may be provided by input received from the personal electronic device. Once the selection is made, the selected policy may be established as the policy for or applied to network traffic generated by the personal electronic device 120.

Figure 4:
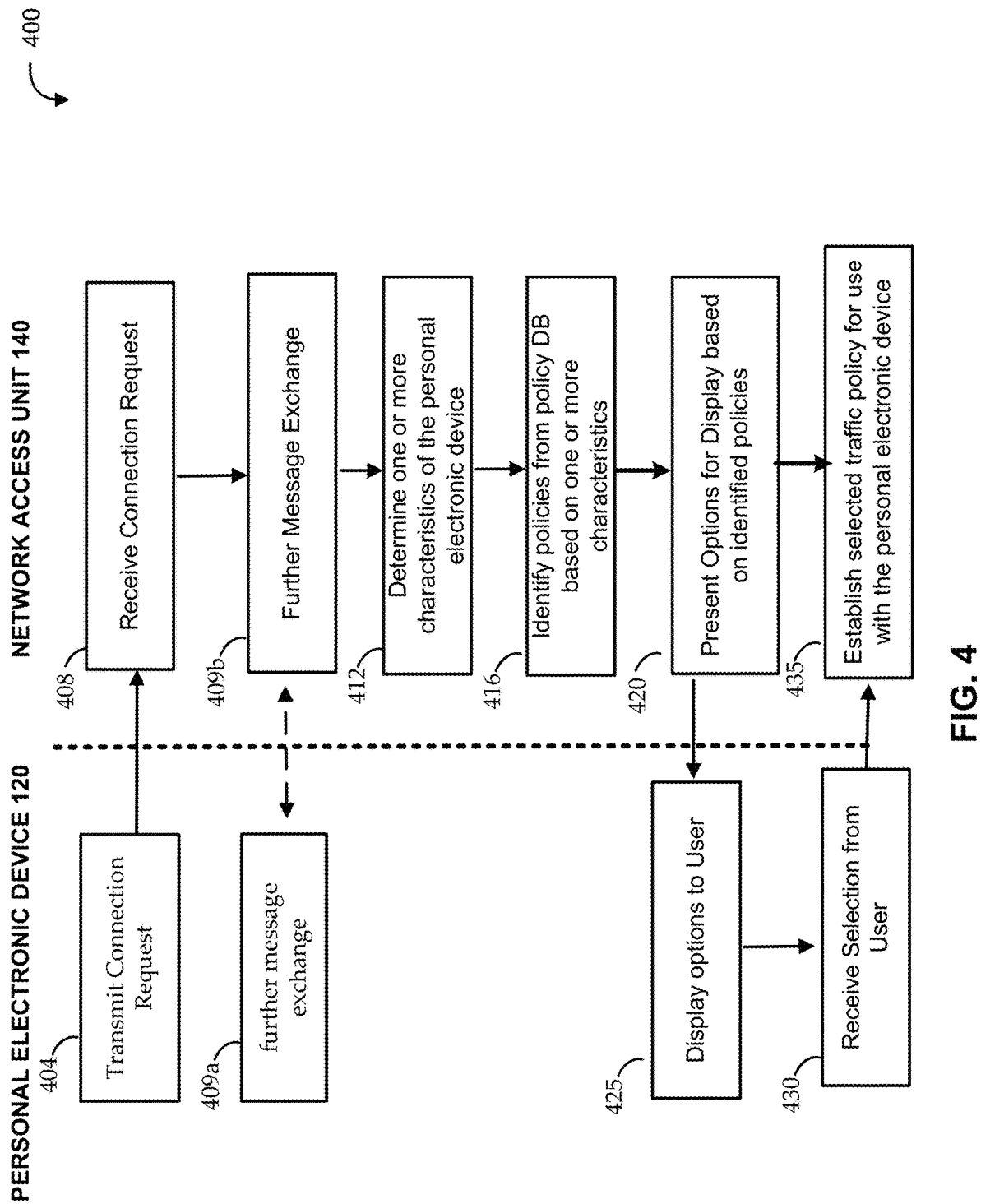
FIG. 4 is a message sequence diagram between a personal electronic device and one embodiment of a network access unit.

FIG. 4 is a message sequence diagram showing communication between a personal electronic device 120 and the network access unit 140 during a provisioning process, such as provisioning process 600 discussed below with respect to FIG. 6. FIG. 4 shows that a personal electronic device 120 may transmit a connection request 404 directly or indirectly, to the network access unit 140. For example, the personal electronic device 120 may send a connection request to a destination node having a particular IP address. In some aspects, the connection request 304 may be a transmission control protocol (TCP) synchronization (syn) message indicating the particular IP address as a destination IP address in an IP header of the connection request. In some other aspects, the connection request transmitted in block 404 may be an http "Get" message, transmitted over a previously established tcp connection.

In block 408, the network access unit 140 receives the connection request from the personal electronic device 120. In some aspects, there may be a further message exchange 409a-b between the personal electronic device 120 and the network access unit 140. One or more network data messages may be included in the further message exchange 409a-b between the personal electronic device 120 and the network access unit 140. For example, in some aspects, the network access unit 140 may transmit an http redirect message to the personal electronic device 120 in response to the http get request described above. The http redirect message may cause the personal electronic device 120 to perform an additional http get request to the web server 216 controlled by the network access unit 140. One or more messages associated with these features may be exchanged as part of further message exchange 409a-b.

In block 412, the network access unit 140 determines one or more characteristics of the device. The determination may be based on one or more of the connection requests received in block 408 and/or additional messages received from the personal electronic device 120 as part of further message exchange 409a-409b. From one or more of these network messages, the network access unit may determine network client data such as one or more of a media access control address, dynamic host configuration protocol (DHCP) fingerprint of the network access unit 140, one or more http headers, a user agent (UA) string from an http header transmitted by the personal electronic device 120, and a transmission control fingerprint of the personal electronic device 120. The determination of device characteristics may then be based on the network client data.

As discussed above with respect to characteristics 274a-n of the device table 270, these determined network characteristics may relate to a form factor of the device, such as whether the device is a laptop, cell phone, game device, or tablet, and/or an indication of a screen size and/or resolution of the device. In some implementations, block 412 may include storing the determined characteristics of the device to the device table 270 or a similar data structure. In particular, block 412 may store values in one or more of device characteristic database fields 274a-n.

In block 416, one or more policies are identified in the policy database based on the one or more determined characteristics of the personal electronic device 120. As discussed above with respect to the rules engine 218 and rules table 280, in some implementations, identification of the one or more policies in block 416 may be based on an evaluation of one or more rules, with each rule comparing at least one or more characteristics of the device to one or more corresponding criteria. If criteria defined by a rule match a device's characteristics, one or more policies identified by the rule may be available for selection. In some other implementations, a rules engine and rules database may not be utilized. Instead, conditional logic within the account provisioner 215 may identify one or more policies in the policy database 225 based on the one or more determined characteristics of the device.

In some aspects, the policies may be further identified based on route information received from a database. For example, origin and destination locations, or city pairs, coordinates, airport identifiers, or the like may be used to determine a policy. This information may be considered by the rules engine 218 when determining which traffic policies are application to the personal electronic device 120. In some aspects, the policies may further be identified based on data received from the transport management computer 202, discussed above with respect to FIG. 2. For example, information relating to a duration of the transport activity, such as an airline flight, may be received from the transport management computer by the network access unit 140, and considered by the rules engine 218 when determining which traffic policies are applicable to the personal electronic device 120. In some aspects, one or more of an origination point and/or destination point for the transport activity may be received from the transport management computer 202. Alternatively, one or more waypoints or information defines a route of the transport activity (such as an airline flight) may be received from the transport management computer 202, or a separate database and utilized to determine an applicable traffic policy.

In block 420, the identified policies are presented for display to the personal electronic device 120. In some aspects, presenting the identified policies for display includes transmitting one or more network messages to the device indicating the identified policies. For example, in some aspects, a user interface may be presented on the personal electronic device 120 via a network message exchange between the network access unit (and specifically web server 216 in some aspects) and the personal electronic device 120. In some aspects, this network message exchange may be an http message exchange, for example, if the user interface is implemented using hypertext markup language (html). Alternatively, the network message exchange may include proprietary messages, for example, if the user interface is presented on the display of the client 120 via a proprietary or industry standard plug-in technology.

The personal electronic device 120 may then display the options presented by the network access unit 140.

Figure 5A:
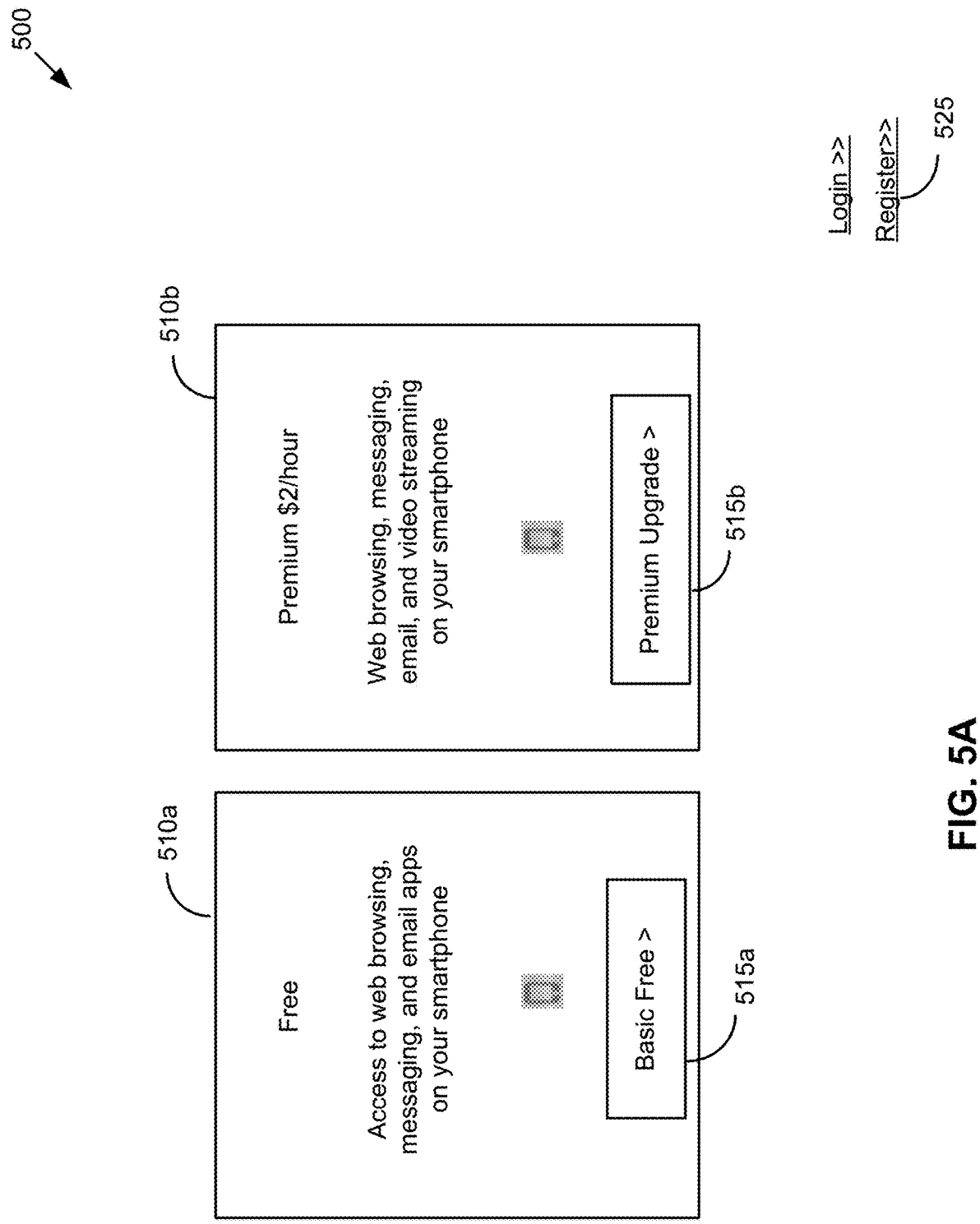
FIG. 5A shows an example user interface displayed on a personal electronic device to provide for selection of one of a plurality of traffic policies.

FIG. 5A shows an example presentation 500 of traffic policy options displayed on a personal electronic device 120, with the personal electronic device 120 having a determined characteristic of a smartphone. As shown, two options 510*a-b* are presented on the display. The first option 510*a* provides access to web browsing, messaging, and email applications on a device having a determined characteristic of a smartphone, and may be selected by selecting the control 515*a*. The second option 510*b* also provides video streaming, for an additional cost relative to option 510*a*, and may be selected by selecting control 515*b*. While two options are shown in FIG. 5A, the disclosed methods and systems could provide more or fewer options. For example, at least one, two, three, four, five, six, seven, eight, nine, or ten options are contemplated.

In some implementations, the smaller screen size associated with the smartphone computer is associated with a smaller load imparted on the network by a user utilizing these types of devices. For example, since a smartphone typically has a smaller screen size than other personal electronic devices, such as laptops, a lower resolution of video data may be provided while maintaining a satisfactory viewing experience for the user of a smartphone, when compared to a resolution that may be necessary to provide an equally satisfying experience for a laptop or tablet user.

Once the determined traffic policy options are displayed on the personal electronic device 120, a user of the personal electronic device 120 may select one of the buttons 515*a-b* to select one of the options 510*a-b*.

Figure 5B:
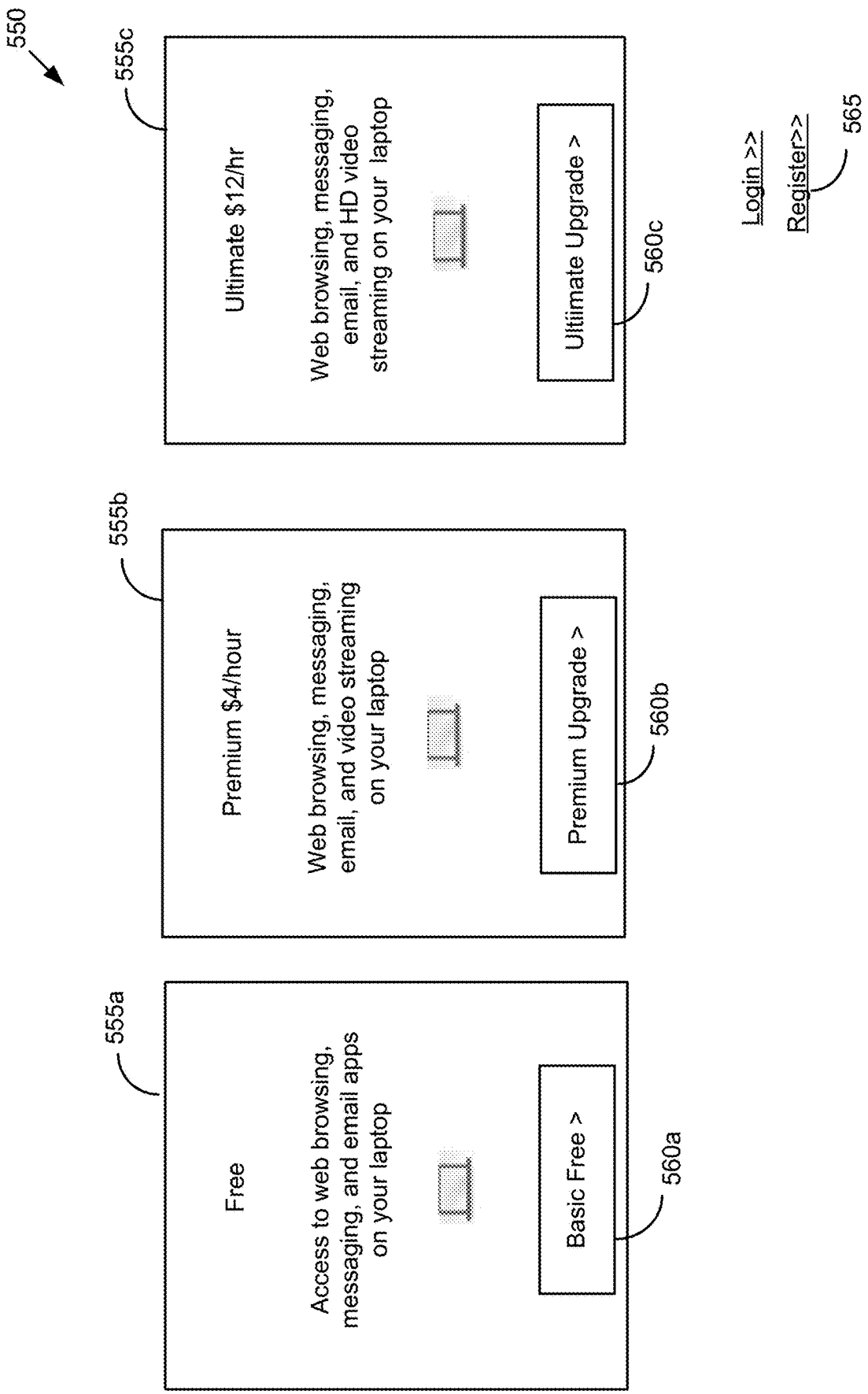
FIG. 5B shows an example user interface displayed on a personal electronic device to provide for selection of one of a plurality of traffic policies.

FIG. 5B shows another embodiment of a user interface 550 of traffic policy options displayed on a personal electronic device 120 having a determined characteristic of a laptop. As shown, three options 555*a-c* are presented on the display. The first option 555*a* provides access to web browsing, messaging, and email applications on a laptop, and may be selected via control 560*a*. The second option 555*b* also provides video streaming, for an additional cost relative to option 555*a*, and may be selected via control 560*b*. The third option 555*c* also provides the same features as option 555*b* and also includes high definition video streaming. Option 555*c* may be selected via control 560*c*. While three options are shown in FIG. 5B, the disclosed methods and systems could provide more or fewer options. For example, at least one, two, three, four, five, six, seven, eight, nine, or ten options are contemplated.

In some implementations, the larger screen size associated with the laptop computer is associated with a larger load imparted on the network by a user utilizing these types of devices. For example, since a laptop typically has a larger screen size than other personal electronic devices, such as smartphones, a higher resolution of video data may need to be provided in order to maintain a satisfactory viewing experience for the user of a laptop, when compared to a resolution that may be necessary to provide an equally satisfying experience for smartphone user. Note the cost of the premium plan in FIG. 5A and the premium plan in FIG. 5B are different. This difference may be based on the type of device in some aspects. For example, the smartphone user of FIG. 5A may be offered a network service plan with similar characteristics as a network service plan offered to a laptop user in FIG. 5B, but the price for these plans may be different because they are offered to users with different types of devices, a smartphone if FIG. 5A and a laptop user in FIG. 5B.

Returning to the discussion of FIG. 4, the personal electronic device 120 may then receive the selection from the user as described in block 430. Data indicating the selection may then be transmitted from the personal electronic device 120 to the network access unit 140. In block 435, the network access unit establishes the selected traffic policy for use with the personal electronic device 120. As described above with respect to FIG. 3, in some aspects, establishing a selected traffic policy for use with the personal electronic device 120 may include storing an indicator of the selected policy in a row of the device table 270. Specifically, a row identifying the particular personal electronic device 120 via device identifier field 272 may be updated to indicate the selected policy. For example, the policy identifier field 276 may be updated.

Figure 6:
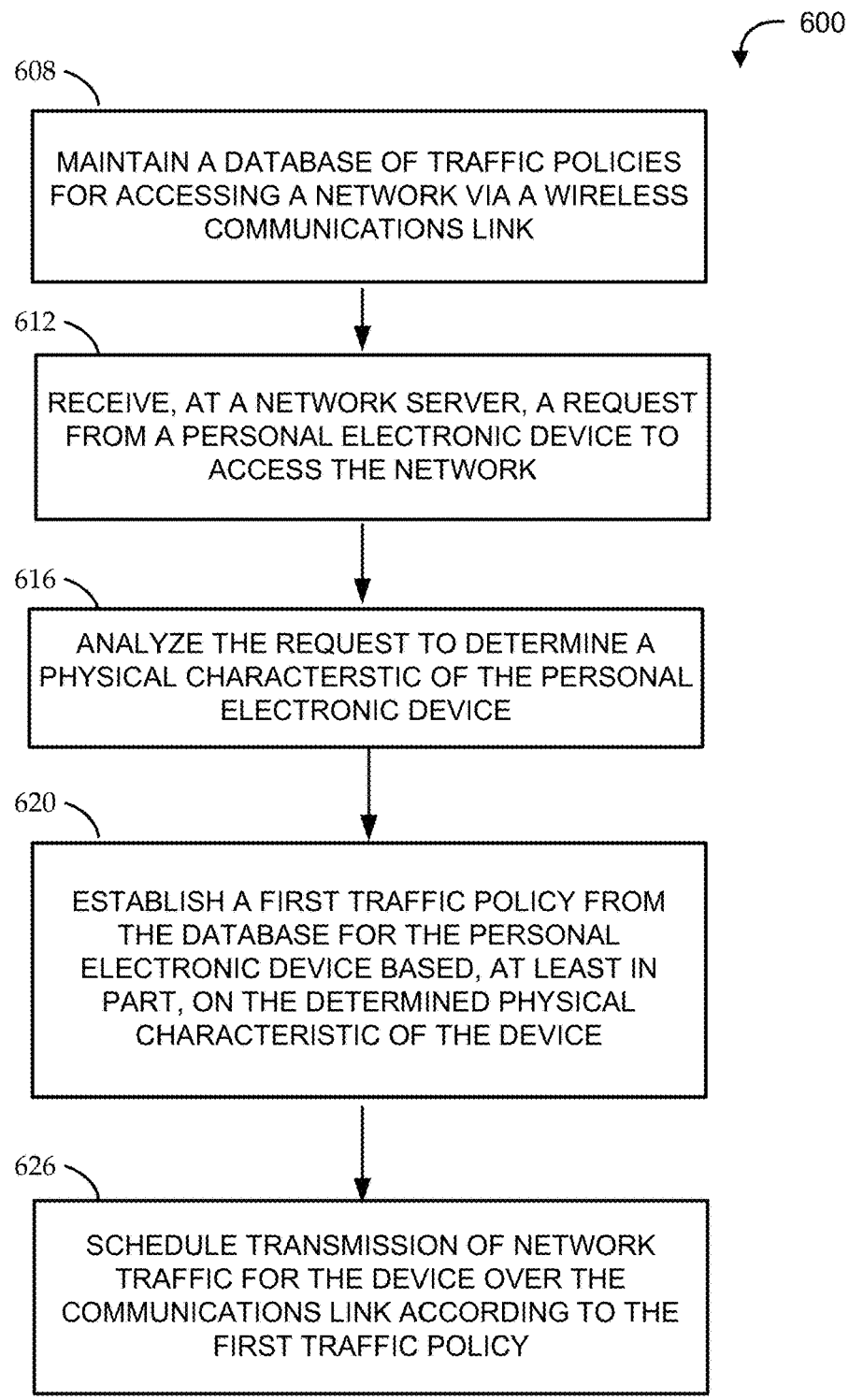
FIG. 6 is a flowchart of a method of establishing a traffic policy for a personal electronic device.

FIG. 6 is a method of providing network connectivity to an personal electronic device 120. In some aspects, process 600 may be performed by the network access unit 140, as illustrated in FIG. 2. For example, in some aspects, the electronic hardware processor 205 may be configured by instructions in one or more of the account provisioner 215 and/or traffic scheduler 220 to perform the functions described below with respect to process 600.

As discussed above, process 600 may enable traffic policies to be applied to personal electronic devices 120*a-n* based on one or more characteristics of the device. Characteristics of the device, such as a device's screen size, may be indicators of a maximum resolution of video data that continues to provide incremental value to that device. For example, since some cell phones may generally include smaller screens than, for example, laptop computers, lower resolution video data may be provided to cell phones as compared to laptop computers, while still meeting expectations of both the cell phone and laptop user. By applying appropriate traffic policies to the laptop and cell phone devices, the resolution of video provided to those devices may be effectively controlled. For example, many streaming media protocols include capabilities that enable sensing of a network capacity. These protocols may then adapt the resolution of video provided over the stream based on the sensed capacity. In some aspects, the traffic policies applied to the different types of devices may affect the capacity sensed by these streaming protocols, thereby altering the resolution of video provided.

In block 608, a database of traffic policies is maintained. Maintaining a database of traffic policies may include storing data defining the traffic policies, for example, via a stable storage medium.

The stored traffic policies may relate to accessing a network via a wireless communications link. In some aspects, the network may be the network 160 discussed above, while the wireless communication link may include the wireless link between the transport craft 110 and satellite 105.

A traffic policy may define network services available to a device under the policy. For example, the policy may define whether one or more of web browsing, email, instant messaging, streaming media, and virtual private networking is available to a device under the policy.

The traffic policies may define one or more scheduling parameters for network traffic associated with the policy. In some aspects, the policy may define one or more transmission weights and/or priorities for data transmitted by a device operating under the policy. For example, the policy may indicate a priority for transmission relative to other personal electronic devices 120a-n. In some aspects, the policy may define a committed information rate (CIR) and a peak information rate (PIR) for data transmitted under the policy.

In some aspects, the policy may define a cost or fee charged to a user of a device operating under the policy. In some aspects, the policy may define an elapsed time period during which network access is enabled for a device under the policy. After a personal electronic device 120 has been provided network access for the defined elapsed time period, no further network access may be allowed under the policy in some aspects. In some aspects, the database maintained in block 608 may include at least the database structure described above with respect to FIG. 3, and traffic policy table 260, and/or device table 270.

In block 612, a request to access the network is received from an personal electronic device. The request may be in the form of a network message transmitted by the personal electronic device to the network access unit 140 in some aspects. As discussed above, when attempting to connect to a network, a personal electronic device 120 may perform a domain name service to establish a destination Internet protocol (IP) address based on a host name (such as "viasat.com").

After a destination IP address is obtained by the personal electronic device 120, a connection request to the IP address may be initiated by the device, in the form of a transmission control synchronization (or SYN) packet. In some aspects, block 612 may include the exchange of a plurality of network messages or packets between the personal electronic device and, for example, the network access unit 140. For example, in some aspects, the personal electronic device may establish a TCP connection with the network access unit. The personal electronic device may then request, for example, content via the established TCP connection. In some aspects, block 612 may include one or more of the functions discussed above with respect to blocks 408, 409b in FIG. 4.

In block 616, the request for network access is analyzed to determine a physical characteristic of the personal electronic device. In some aspects, a plurality of packets including the request may be analyzed to determine a physical characteristic of the device. For example, as discussed above with respect to blocks 404, 408, 409a-b, the one or more messages analyzed in block 616 may include a TCP SYN packet and/or http get request. In some aspects, one or more third party libraries may be utilized to determine one or more physical characteristics of the personal electronic device. For example, one typical library is provided by Netbiscuits™ of the United Kingdom. The analysis may include consideration of one or more of TCP signatures, http mime types, and/or other characteristics of network packets generated by the personal electronic device 120.

The physical characteristics determined in block 616 may include one or more of a form factor of the device (e.g. laptop, cell phone, portable game device, tablet), an indicator of screen size of the device, an indicator of a manufacturer and/or model of the device, an indicator of a processing capability of the device, and an indicator of the size of volatile memory of the device.

In block 620, a traffic policy from the database is established for or assigned to the personal electronic device, based at least in part, on the determined physical characteristic(s). In some aspects, the traffic policy may be established using a rules engine and rules table similar to that described above with respect to FIG. 3. In some implementations, the one or more characteristics of the device may be compared to one or more respective criteria defined by one or more rules. In some simple example, three separate rules may be defined, one for each of a device characteristic indicating a laptop computer, tablet computer, and cell phone.

In response to a set of rule criteria matching characteristics of the personal electronic device, a traffic policy defined by the rule may be associated with or assigned to the personal electronic device 120. In some aspects, as shown in FIG. 3, if no criteria match the known characteristics of the personal electronic device, a default policy may be assigned, as provided for by example rule 281n.

In some aspects, block 620 may determine a plurality of traffic policies, including the first traffic policy, from the database based on the determined physical characteristic(s) of the device. Data indicating the plurality of traffic policies may then be provided to the personal electronic device 120 for display. For example, as discussed above with respect to FIG. 3, a rules table may include a rule, such as rule 281a, that identifies multiple policies 288a-n that may apply when the rule's criteria 284a-n are met. In this example, the plurality of policies may be each of the policies identified by records 288a-n.

In some aspects, the plurality of traffic policies may be established based on a route of flight of an aircraft. For example, as discussed above, in some aspects, route information may be obtained from a flight information database or a flight management computer. Information such as source and/or destinations of the flight, geographic coordinates, airport codes, etc., may allow determination of which particular access networks are available during the flight, and one or more capabilities of the available access networks. The selection of traffic policies may be made so as to be compatible with the available access networks. For example, if the aircraft is passing through a region having access networks of relatively lower capabilities, the available transmission policies may reflect that. For example, in some aspects, certain network services may not be available when access is available via particular access networks with reduced capabilities. Alternatively, prices for particular services may be adjusted based on the access networks available over a route of flight. In some aspects, access networks of relatively higher capabilities may be available over a particular route of flight. In these aspects, establishment of the traffic policy and selection of the plurality of traffic polices may be based on the higher capabilities. For example, greater capabilities may be offered in some aspects. For example, high definition movies may be provided when certain access networks are available but not when other access networks are available.

Block 620 may also include providing, to the personal electronic device 120, data indicating the plurality of traffic policies for display. For example, as discussed above with respect to block 420 of FIG. 4, presenting or providing for display may include transmitting one or more network messages to the personal electronic device 120 indicating the determined traffic policies. In some aspects, these network messages may cause a user interface to be displayed on the personal electronic device 120, enabling a user of the device to make a selection among the presented plurality of traffic policies. Input may then be received from the device indicating which of the plurality of traffic policies was selected. The first traffic policy may then be established for the personal electronic device based on the selection.

In block 626, transmission of network traffic for the device is scheduled over the communications link according to the established traffic policy. In some aspects, block 625 may be performed by the processor 205 configured by instructions stored in the traffic scheduler 220.

In some aspects, block 626 also includes providing network services to the device based on the established traffic policy. For example, as discussed above, a traffic policy 261 may include one or more parameters 264 defining which network services are allowed and/or prohibited under the policy. In some aspects, block 626 may include performing traffic classification of network traffic received from a personal electronic device, to determine, for example, whether the traffic is web browsing, email, messaging, video streaming, or another form of network traffic. In some aspects, traffic classification may be performed by instructions stored in the traffic classifier 217, discussed above with respect to FIG. 2. Based on the classification, block 626 may allow network services defined as allowed under the established policy and prohibit or reject services defined as prohibited under the policy. Allowing network services may include forwarding and/or relaying network messages associated with an allowed network service across a gateway, router, or firewall, such as network access unit 140. Prohibiting a network service may include dropping or not forwarding network messages associated with a prohibited network service. In some aspects, prohibiting a network service may include actively blocking or "naking" network messages associated with the prohibited network service. In some aspects, as discussed above, a traffic policy may indicate that one or more of email, web browsing, instant messaging, chat, streaming media, virtual private networking, or file transfers are either prohibited or allowed under the policy.

Figure 7:
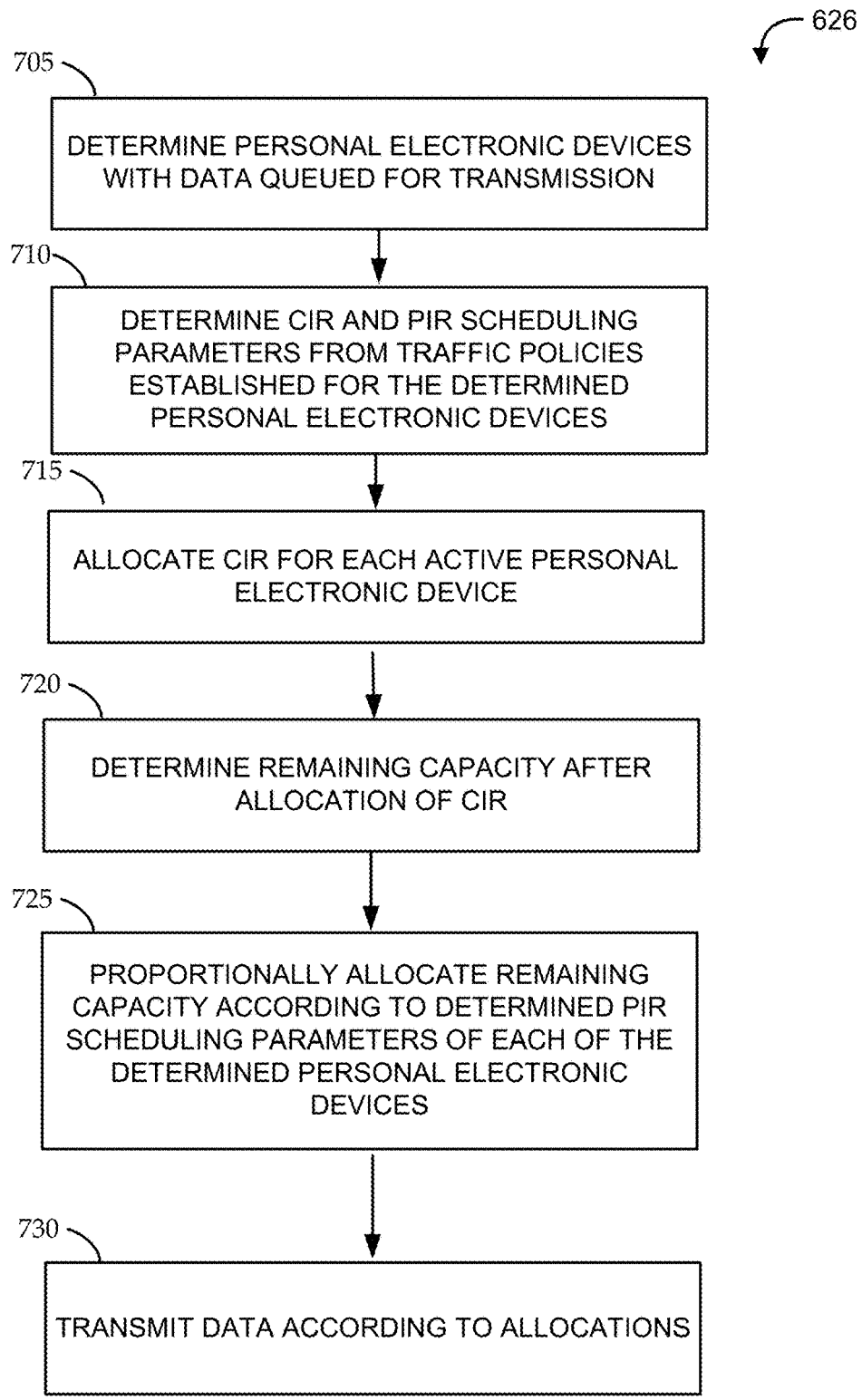
FIG. 7 is a flowchart of a method of scheduling network traffic based on a selected traffic policy.

FIG. 7 is one example of scheduling transmission of network traffic over a communications link according to an established traffic policy. In some aspects, process 700 may be performed by the processor 205, configured by instructions included in the traffic scheduler 220*d*. In some aspects, process 700 may be performed as part of block 626, discussed above.

In block 705, personal electronic device 120 with data queued for transmission are determined. For example, in some aspects, scheduling of data for transmission may occur in repetitive cycles, with process 700 demonstrating one example cycle of allocation. During each cycle, one or more personal electronic devices 120*a-n* of a network may have data available for transmission. For these personal electronic devices 120*a-n* may have transmitted network data to the network access unit 140, where the network access unit is functioning as a router, bridge, or gateway between the personal electronic devices 120*a-n* and the network 160. In some aspects, block 705 determines which devices have data buffered or waiting for transmission during a particular cycle. This may include scanning one or more data queues to identify which users have data waiting.

In block 710, a committed information rate (CIR) and peak information rate (PIR) are determined for each of the devices determined in block 705. In some aspects, the CIR and PIR may be obtained from traffic policies assigned to or controlling transmission of each of the determined devices. For example, as discussed above with respect to FIG. 3, a particular transmission policy 261 may include one or more transmission parameters 264*a-n*. In some aspects, one or more of the transmission parameters 264*a-n* may define a CIR and PIR for the respective transmission policy. In these aspects, block 710 may then read the CIR and PIR stored in the policy record 261 to determine the CIR and PIR.

In block 715, data is allocated for transmission according to the CIR for each device with data queued for transmission. For example, the CIR parameter may indicate a minimum amount of each device's data is to be transmitted during each allocation cycle discussed above. By allocating data according to the CIR in block 715, the minimum amount of data for each device is fulfilled according to the CIR.

In block 720, a remaining network capacity is determined based on the CIR allocation. For example, allocation of each device's CIR in a particular allocation cycle according to block 715 will consume a portion of available network capacity. In some aspects of b lock 720, the remaining capacity may be determined according to: remaining capacity=available capacity−CIR allocation for each device.

In block 725, the remaining capacity is proportionally allocated according to the determined PIR scheduling parameters. For example, the PIR parameters of each device with data queued for transmission may define a proportional allocation of the remaining network capacity for a particular allocation cycle that should be allocated to each device.

In block 730, data is transmitted according to the allocations in block 715 and 725. For example, in some aspects, instructions in the transmission scheduling module 220 may transmit data according to the allocations determined in blocks 715 and 725 via the processor 205 and network interface 210, to the modem 174, shown in FIG. 1. The data may then be transmitted to the satellite 105 and then to the network 160, also shown in FIG. 1.

As discussed above, process 700 may be repeated for each allocation cycle of the transmission scheduler 220. In some aspects, the transmission scheduler 220 may utilize a different process for scheduling transmissions of the personal electronic devices 120*a-n* according to the assigned transmission policies. The above description of process 700 is just one example implementation.

Figure 8:
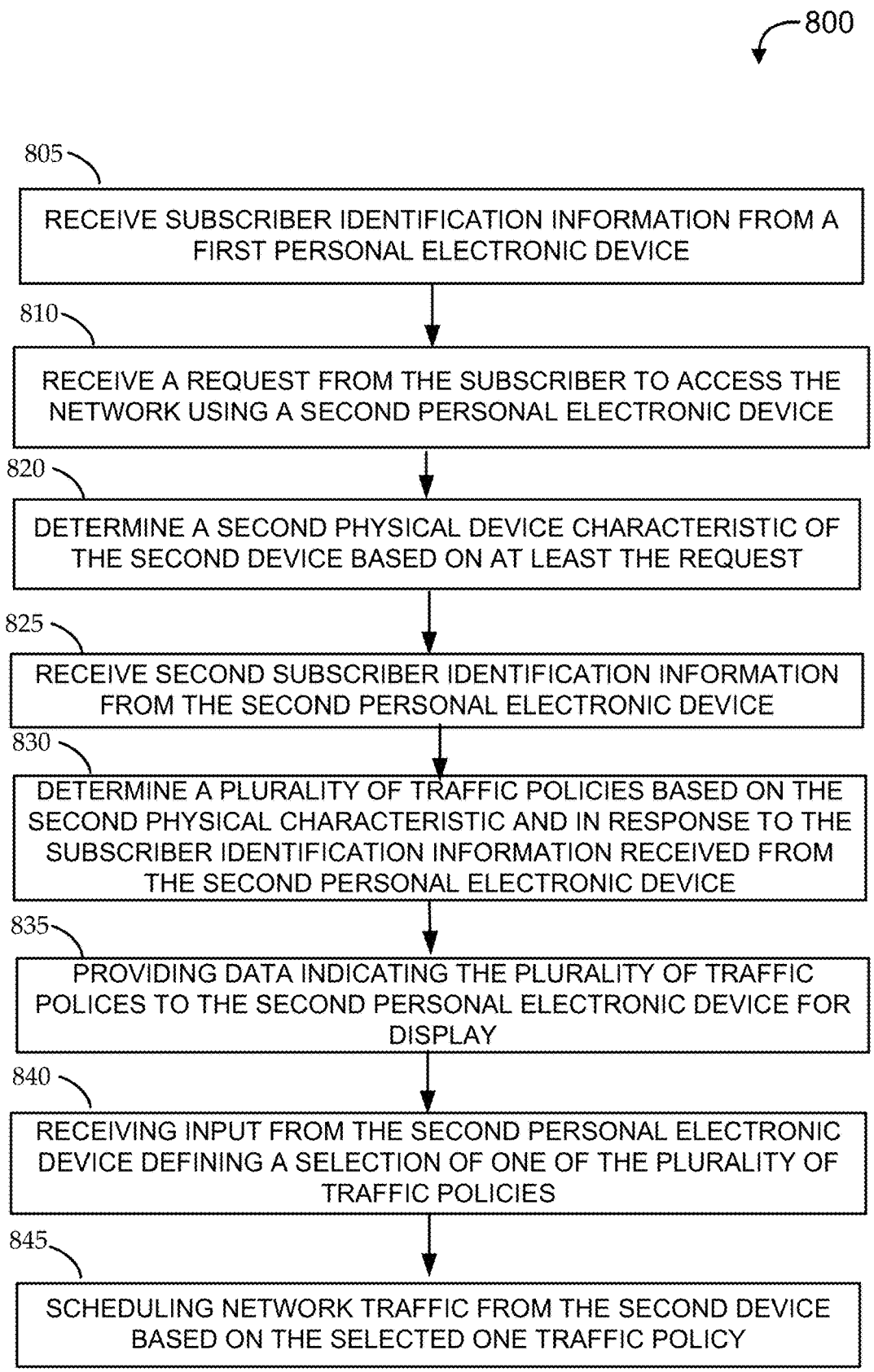
FIG. 8 is a method of modifying a selected traffic policy for a user accessing a access network from two different personal electronic devices.

FIG. 8 is a flowchart of a method for modifying an established traffic policy for a user. In particular a user may wish to communicate with the network 160 via more than one device during a transportation activity such as an airline flight. In this situation, the user may first establish a communication session using a first device and a first established traffic policy. The user may then attempt to connect to the network 160 via a second device. The first traffic policy may or may not be appropriate for the second device. Thus, process 800 modifies the traffic policy as necessary such that the user may have a policy appropriate for all devices with which a connection to network 160 is desired. The description below assumes that process 600 has already been performed and therefore, a first traffic policy has been established for the first device.

In some aspects, process 800 may be performed by the network access unit 140. In some aspects, instructions stored in one or more of the account provisioner 215, rules engine 218, traffic scheduler 220, and/or web server 216 may configure the processor 205 to perform one or more of the functions discussed below with respect to process 800.

In block 805, first subscriber identification information is received from a first personal electronic device 120. The subscriber identification information may include a user name and password in some aspects. In some aspects, the subscriber identification information may include biometric information of the subscriber. Alternatively, the subscriber identification information may include a station address of a device associated with the subscriber.

In block 810, a request is received from the subscriber to access the network using a second personal electronic device 120. For example, in some aspects, to establish the traffic policy for the first personal electronic device 120, a subscriber identification may also be associated with the traffic policy and/or the first personal electronic device 120. For example, a user account may be established to provide for establishment of the traffic policy for the first personal electronic device 120.

The user may then utilize a second personal electronic device 120 to attempt to connect to the network 160. In some aspects, in response to the attempt by the second personal electronic device 120 to access the network 160, a user interface may be presented for display on the second personal electronic device 120. For example, as shown in FIG. 5A, the user interface 500 may be presented in some aspects, giving a user an option of various service plans from which to choose.

In block 820, the request from the second device is analyzed to determine a physical characteristic of the second device. In some aspects, block 815 may include one or more of the functions discussed above with respect to block 616, but applied to the second personal electronic device 120 instead of the first personal electronic device 120.

In block 825, second subscriber information is received from the second device. For example, as shown in FIG. 5A, a subscriber may login via control 525 when presented with a user interface. The second subscriber information received in block 825 may, in various embodiments, conform to one or more of the types of subscriber information described above with respect to block 805.

In block 830, a second plurality of traffic policies are determined based on the second physical characteristic and in response to the second subscriber identification information received from the second device. For example, in some aspects, the second plurality of traffic policies may be determined based on the prior selection of the first traffic policy in process 600, discussed above with respect to FIG. 6. For example, if the user selected a plan that included support for multiple devices as the first traffic policy, then the second plurality of traffic policies may include the first traffic policy, as the first traffic policy may be adequate to support network access by either the first or second device. Alternatively, if the first traffic policy does not accommodate multiple devices, the second plurality of traffic policies may include policies supporting multiple devices, but may not include the first traffic policy.

In block 835, data indicating the plurality of traffic polices are provided for display on an electronic display of the second device. As discussed above with respect to block 620, in some aspects, providing data for display may include transmitting data over a network to the second device, the data indicating a user interface to display on an electronic display of the second personal electronic device 120. In some aspects, the data may define an interface similar to that shown in FIG. 5A and discussed above on an electronic display of the second electronic device.

In block 840, input is received from the second device defining a selection of a second traffic policy of the plurality of traffic policies. In some aspects, the input may be received over a network from the second device, in response to a user selecting a control on a user interface corresponding to the selected traffic policy.

In some aspects, a comparison of the first traffic policy (selected when process 600 was performed) is compared to the second policy selected in block 840. The comparison may determine a first set of one or more capabilities present in the first traffic policy that are not present in the second traffic policy. Similarly a second set of capabilities may be determined that are present in the second traffic policy but not present in the first traffic policy. In some aspects, an indication of one or more of the first and second set of capabilities may be presented to the second device for display. For example, in some aspects, if the second traffic policy provides fewer capabilities than the first traffic policy in at least one respect, data indicating a warning message to the user may be provided to the second device for display. In some aspects, differences between the first and second traffic policies may also be indicated in the message.

In block 845, network traffic from the second device is scheduled based on the selected traffic policy. In some aspects, one or more of the functions discussed above with respect to block 616 of FIG. 6 may be included in block 845. In some aspects, block 845 may be implemented by instructions included in the traffic scheduler 220 of FIG. 2, in conjunction with the processor 205.

The methods disclosed herein include one or more actions for achieving the described method. The method and/or actions can be interchanged with one another without departing from the scope of the claims. In other words, unless a specific order of actions is specified, the order and/or use of specific actions can be modified without departing from the scope of the claims.

The functions described can be implemented in hardware, software, firmware, or any combination thereof. If implemented in software, the functions can be stored as one or more instructions on a tangible computer-readable medium. A storage medium can be any available tangible medium that can be accessed by a computer. By way of example, and not limitation, such computer-readable media can include RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

A computer program product can perform certain operations presented herein. For example, such a computer program product can be a computer readable tangible medium having instructions tangibly stored (and/or encoded) thereon, the instructions being executable by one or more processors to perform the operations described herein. The computer program product can include packaging material. Software or instructions can also be transmitted over a transmission medium. For example, software can be transmitted from a website, server, or other remote source using a transmission medium such as a coaxial cable, fiber optic cable, twisted pair, digital subscriber line (DSL), or wireless technology such as infrared, radio, or microwave.

Further, modules and/or other appropriate means for performing the methods and techniques described herein can be downloaded and/or otherwise obtained by suitable terminals and/or coupled to servers, or the like, to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized. Features implementing functions can also be physically located at various positions, including being distributed such that portions of functions are implemented at different physical locations.

In describing the present invention, the following terminology will be used: The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" means quantities, dimensions, sizes, formulations, parameters, shapes and other characteristics need not be exact, but can be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations including, for example, tolerances, measurement error, measurement accuracy limitations and other factors known to those of skill in the art, can occur in amounts that do not preclude the effect the characteristic was intended to provide. Numerical data can be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described. A plurality of items can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items can be used alone or in combination with other listed items. The term "alternatively" refers to selection of one of two or more alternatives, and is not intended to limit the selection to only those listed alternatives or to only one of the listed alternatives at a time, unless the context clearly indicates otherwise. The term "coupled" as used herein does not require that the components be directly connected to each other. Instead, the term is intended to also include configurations with indirect connections where one or more other components can be included between coupled components. For example, such other components can include amplifiers, attenuators, isolators, directional couplers, redundancy switches, and the like. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples. As used herein, a "set" of elements is intended to mean "one or more" of those elements, except where the set is explicitly required to have more than one or explicitly permitted to be a null set.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein can be utilized. Accordingly, the appended claims include within their scope such processes, machines, manufacture, compositions of matter, means, methods, or actions.

What is claimed is:

1. A method of providing network access to one or more personal electronic devices within an airplane via a wireless communications link, comprising:
   obtaining information associated with a flight for the airplane;
   identifying one or more access networks available for providing the network access to the one or more personal electronic devices within the airplane during the flight based at least in part on the information;
   determining a first traffic policy for a first personal electronic device of the one or more personal electronic devices for the flight based at least in part on characteristics of the one or more access networks; and scheduling transmission of network traffic for the first personal electronic device during the flight over the wireless communications link according to the first traffic policy.

2. The method of claim 1, further comprising:
determining a class of personal electronic device associated with the first personal electronic device, wherein determining the first traffic policy is based at least in part on the class of personal electronic device associated with the first personal electronic device.

3. The method of claim 1, further comprising:
receiving, at a network access unit, a request from the first personal electronic device for the network access via the wireless communications link;
identifying the first traffic policy based on a physical characteristic of the first personal electronic device; and
establishing the first traffic policy for the first personal electronic device, wherein scheduling the transmission of the network traffic for the first personal electronic device is based on establishing the first traffic policy.

4. The method of claim 1, further comprising:
receiving, at a network access unit, a request from the first personal electronic device for the network access via the wireless communications link;
identifying a set of traffic policies based on a physical characteristic of the first personal electronic device, wherein the set of traffic policies includes the first traffic policy;
providing, to the first personal electronic device for display, data indicating the set of traffic policies;
receiving input from the first personal electronic device indicating a selection of the first traffic policy from among the set of traffic policies; and
establishing the first traffic policy for the first personal electronic device based on the selection, wherein scheduling the transmission of the network traffic for the first personal electronic device is based on establishing the first traffic policy.

5. The method of claim 1, further comprising:
determining a route of flight for the airplane based on the information, wherein identifying the one or more access networks comprises identifying one or more access networks available along the route.

6. The method of claim 5, wherein the information comprises an origin location and a destination location associated with the flight, and wherein determining the route of flight for the airplane is based, at least in part, on the origin location and the destination location.

7. The method of claim 5 wherein the information comprises a waypoint associated with the flight, and wherein determining the route of flight for the airplane is based, at least in part, on the waypoint.

8. The method of claim 1, wherein the information comprises a remaining flight time, and wherein determining the first traffic policy is further based at least in part on the remaining flight time satisfying a threshold amount of time.

9. The method of claim 1, wherein the information is obtained from a flight management computer of the airplane.

10. The method of claim 1, wherein the information is obtained from a database.

11. The method of claim 1, wherein the characteristics of the one or more access networks comprises a respective capacity of each of the one or more access networks.

12. The method of claim 11, wherein the respective capacity of each of the one or more access networks comprises a bandwidth, a latency, a throughput, a packet loss rate, or a combination thereof.

13. The method of claim 1, wherein the first traffic policy is associated with allowing a first set of services and prohibiting a second set of services.

14. An apparatus for providing network access to one or more personal electronic devices within an airplane via a wireless communications link, the apparatus comprising:
an electronic hardware processor configured to:
obtain information associated with a flight for the airplane;
identify one or more access networks available for providing the network access to the one or more personal electronic devices within the airplane during the flight based at least in part on the information;
determine a first traffic policy for a first personal electronic device of the one or more personal electronic devices for the flight based at least in part on characteristics of the one or more access networks; and
schedule transmission of network traffic for the first personal electronic device during the flight over the wireless communications link according to the first traffic policy.

15. The apparatus of claim 14, wherein the electronic hardware processor is further configured to:
determine a class of personal electronic device associated with the first personal electronic device; and
determine the first traffic policy based at least in part on the class of personal electronic device associated with the first personal electronic device.

16. The apparatus of claim 14, wherein the electronic hardware processor is further configured to:
receive a request from the first personal electronic device for the network access via the wireless communications link;
identify the first traffic policy based on a physical characteristic of the first personal electronic device; and
establish the first traffic policy for the first personal electronic device, wherein scheduling the transmission of the network traffic for the first personal electronic device is based on establishing the first traffic policy.

17. The apparatus of claim 14, wherein the electronic hardware processor is further configured to:
receive a request from the first personal electronic device for the network access via the wireless communications link;
identify a set of traffic policies based on a physical characteristic of the first personal electronic device, wherein the set of traffic policies includes the first traffic policy;
provide, to the first personal electronic device for display, data indicating the set of traffic policies;
receive input from the first personal electronic device indicating a selection of the first traffic policy from among the set of traffic policies; and
establish the first traffic policy for the first personal electronic device based on the selection, wherein scheduling the transmission of the network traffic for the first personal electronic device is based on establishing the first traffic policy.

18. The apparatus of claim 14, wherein the electronic hardware processor is further configured to:
determine a route of flight for the airplane based on the information, wherein identifying the one or more access networks comprises identifying one or more access networks available along the route.

19. The apparatus of claim 18, wherein the information comprises an origin location and a destination location associated with the flight, and wherein determining the route of flight for the airplane is based, at least in part, on the origin location and the destination location.

20. The apparatus of claim 18, wherein the information comprises a waypoint associated with the flight, and wherein determining the route of flight for the airplane is based, at least in part, on the waypoint.

21. The apparatus of claim 14, wherein the information comprises a remaining flight time, and wherein determining the first traffic policy is further based at least in part on the remaining flight time satisfying a threshold amount of time.

22. The apparatus of claim 14, wherein the information is obtained from a flight management computer of the airplane.

23. The apparatus of claim 14, wherein the information is obtained from a database.

24. The apparatus of claim 14, wherein the characteristics of the one or more access networks comprises a respective capacity of each of the one or more access networks.

25. The apparatus of claim 24, wherein the respective capacity of each of the one or more access networks comprises a bandwidth, a latency, a throughput, a packet loss rate, or a combination thereof.

26. The apparatus of claim 14, wherein the first traffic policy is associated with allowing a first set of services and prohibiting a second set of services.

* * * * *